United States Patent [19]

Bramante

[11] Patent Number: 5,996,202
[45] Date of Patent: Dec. 7, 1999

[54] DEVICE FOR AUTOMATED ASSEMBLING OF CONE HALF-BITS OF A VALVE OF AN INTERNAL COMBUSTION ENGINE

[75] Inventor: Giuseppe Bramante, Sant' Ambrogio, Italy

[73] Assignee: Comau S.p.A., Torino, Italy

[21] Appl. No.: 09/025,775

[22] Filed: Feb. 19, 1998

[30] Foreign Application Priority Data

Mar. 18, 1997 [IT] Italy .................................. TO97A0222

[51] Int. Cl.[6] .................................................. B23P 19/04
[52] U.S. Cl. .................................................. 29/249; 29/252
[58] Field of Search .............................. 29/771, 787, 798, 29/813, 215, 809, 888.4, 888.41, 888.46, 258, 259, 261, 252, 249

[56] References Cited

U.S. PATENT DOCUMENTS

| | | | |
|---|---|---|---|
| 2,628,420 | 2/1953 | Skilling | 29/252 |
| 2,835,029 | 5/1958 | Collins, Sr. | 29/261 |
| 3,316,623 | 5/1967 | Clark | 29/249 |
| 3,793,999 | 2/1974 | Seiler et al. | 29/215 |
| 4,095,324 | 6/1978 | Lawson | 29/249 |
| 5,207,196 | 5/1993 | Kuonen et al. | 29/215 |

*Primary Examiner*—S. Thomas Hughes
*Assistant Examiner*—Jermie E. Cozart
*Attorney, Agent, or Firm*—Sughrue, Mion, Zinn Macpeak & Seas, PLLC

[57] ABSTRACT

A device for automated assembling of cone half-bits on a valve of an internal combustion engine has a pushing rod which is introduced inside a plurality of longitudinal petals which are elastically deflectable outwardly in a radial direction, said petals being adapted to be introduced between the two cone half-bits so as to cause them to diverge from each other during the assembling operation.

3 Claims, 3 Drawing Sheets

DEVICE FOR AUTOMATED ASSEMBLING OF CONE HALF-BITS OF A VALVE OF AN INTERNAL COMBUSTION ENGINE

BACKGROUND OF THE INVENTION

The present invention relates to a device for automated assembling of cone half-bits of a valve of an internal combustion engine.

According to the conventional art, a valve of an internal combustion engine comprises a mushroom-shaped body including a stem on whose free end a cup element is secured having a conical inner surface, tapering towards the mushroom-shaped head of the valve, and an outer annular flange for abutment of one or more return helical springs for the valve, said cup element being secured on said end of the valve stem with the interposition of an annular body having an outer conical surface, also tapering towards the mushroom-shaped head of the valve, which is formed by two cone half-bits which are freely in contact with each other at a plane containing the axis of said annular body, said cone half-bits defining one or more circumferential inner ribs in their assembled condition, said ribs engaging corresponding circumferential grooves provided on said end of the valve stem.

In his European patent application EP-A-0 708 228, the same Applicant has proposed a method for automated assembling of the cone half-bits on the valve stem, wherein the above mentioned two cone half-bits are mounted by causing them to slide on the valve stem while holding them temporarily in a diverging condition, with their ends of lower diameter spaced apart from each other. In this previous patent application, the Applicant has also proposed a device for carrying out the above mentioned method, comprising means for mounting said cone half-bits by causing them to slide on the valve stem while holding them in a diverging condition, with their ends of lower diameter spaced apart from each other, wherein said means included a tubular body adapted to be displaced along an axis coincident with the axis of the valve stem and for engagement with the annular flange of the cup element, said tubular body being further provided with a plurality of jaws elastically deflectable outwardly in a radial direction and having inclined inner surfaces diverging from each other in the direction of the mushroom-shaped head of the valve and adapted to engage the end surfaces of greater diameter of the two cone half-bits, said inserting device further including a pushing rod, slidably mounted within the tubular body and ending with a tip for co-operating with said jaws for holding the two cone half-bits in the above mentioned diverging position until they reach their assembling position on the stem.

SUMMARY OF THE INVENTION

The object of the present invention is that of further improving the previously proposed device, in order to reduce the risk of improper assembling of the two cone half-bits at a minimum.

In view of achieving this object, the invention provides a device of the above indicated type, characterized in that said pushing rod is slidably mounted within a sleeve defined by a plurality of longitudinal petals which are elastically deflectable in a radial direction outwardly due to the engagement of said pushing rod within an end conical portion of the inner passage defined between said petals, said petals on their turn being adapted to penetrate inside the two cone half-bits during the assembling stage of the latter.

Due to the above indicated feature, the diverging movement of the two cone half-bits during the assembling stage is obtained without that a relative sliding movement between the pushing rod and the cone half-bits takes place, which reduces the risk of an improper assembling of the cone half-bits at a minimum.

According to a further preferred feature of the invention, said pushing rod, rather than being subjected to the action of a return spring, as in the case of the previously proposed solution, is connected to the stem of a fluid cylinder, which controls the position thereof. Such active control on the position of the pushing rod enables a more precise operation to be carried out and further reduces the risk of improper assembling of the cone half-bits. However, naturally the invention is also applicable with an arrangement similar to that adapted in the previously proposed solution as regards the control of the position of the pushing rod, i.e. by adopting again a return spring, in lieu of the above mentioned fluid cylinder, in order to provide a passive control of the position of the rod.

BRIEF DESCRIPTION OF THE DRAWINGS

Further features and advantages of the invention will become apparent from the description which follows with reference to the annexed drawings, given purely by way of non-limiting example, in which.

DETAILED DESCRIPTION OF THE INVENTION

Figure 1:
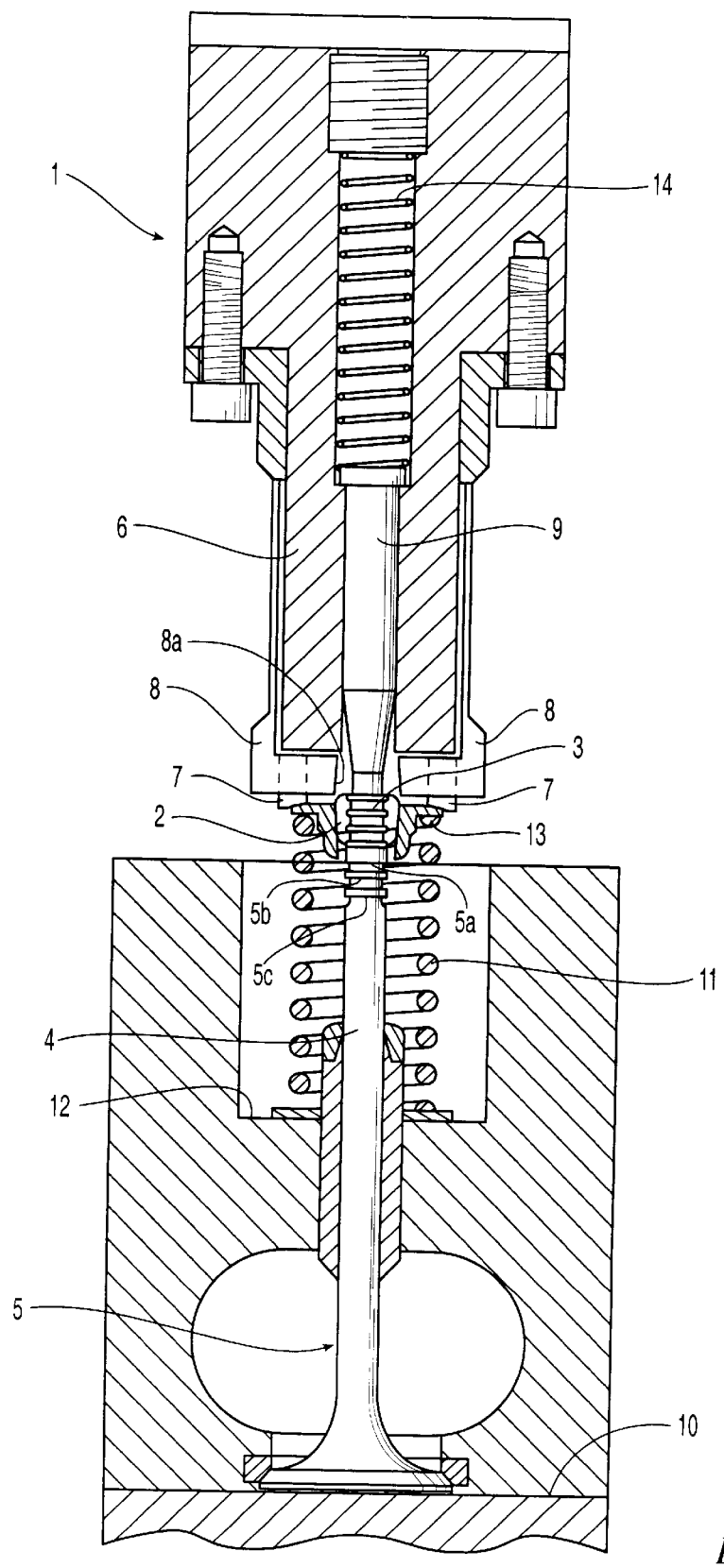
FIG. 1 is a view in cross-section of a device for automated assembling of the cone half-bits on a valve of an internal combustion engine, according to what has been proposed in the previous European patent application EP-A-0 708 228 of the same Applicant.

FIG. 1 shows a device 1 for automated assembling of the cone half-bits 2, 3 on the upper end of the stem 4 of a valve 5 of an internal combustion engine, according to what is illustrated in previous European patent application EP-A-0 708 228 of the same Applicant. The device 1 comprises a tubular body 6 provided at its front end with a plurality of pushing fingers 7 which are equi-angularly spaced, as well as with a plurality of jaws 8, which are elastically deflectable in a radial direction outwardly and having inner inclined surfaces 8a diverging from each other towards the mushroom-shaped head of the valve 5 and adapted to engage the end surfaces of greater diameter of the two cone half-bits 2, 3. The device 1 further comprises a pushing rod 9 slidably mounted within the tubular body 6 and ending with a tip which is to be inserted between the two cone half-bits 2, 3 and for cooperation with the jaws 8 in order to hold the cone half-bits 2, 3 in a diverging position, with their ends of lower diameter spaced from each other, in order to enable the two cone half-bits to be lowered on the stem 4 of the valve until they reach the proper assembling position, to which the two cone half-bits can snap with their inner circumferential ribs engaging the cooperating grooves 5a, 5b, 5c of stem 5.

The operation of the inserting device shown in FIG. 1 is as follows.

The valve 5 is positioned so as to rest with its mushroom-shaped head against a stop surface 10, whereupon the conventional helical spring 11 associated with the valve is mounted, so that it rests on the respective supporting surface 12. On the upper end of spring 11 the conventional cup element 13 is placed, which has an inner conical hole and the two cone half-bits 2, 3 are positioned within this hole, so as to form an annular conical body resting against the inner conical surface of the cup element 13. At this time, the inserting device 1 is lowered, by displacing means of any known type (not shown) so that the pushing fingers 7 of the tubular body 6 move the cup element 13 downwardly, pressing spring 11. At the same time, the tip of pushing rod 9 is inserted through the two cone-half-bits until it stops against the top surface of stem 4 of valve 5. Once this condition has been reached, the tubular body 6 keeps on being moved downwardly, causing compression of a spring 14 biassing the pushing rod 9 so as to cause engagement of the deflectable jaws 8 on the outer surface of the two cone half-bits 2, 3. As a result of this engagement, as well as of the engagement of the pushing rod 9 inside the two cone half-bits, the latter are kept in a diverging condition, with their ends of lower diameter spaced from each other, until the cone half-bits reach, with their downward movement, the proper assembling position, to which they can snap with their circumferential inner ribs engaging the cooperating circumferential grooves 5a, 5b, 5c of the valve stem.

Figure 2:
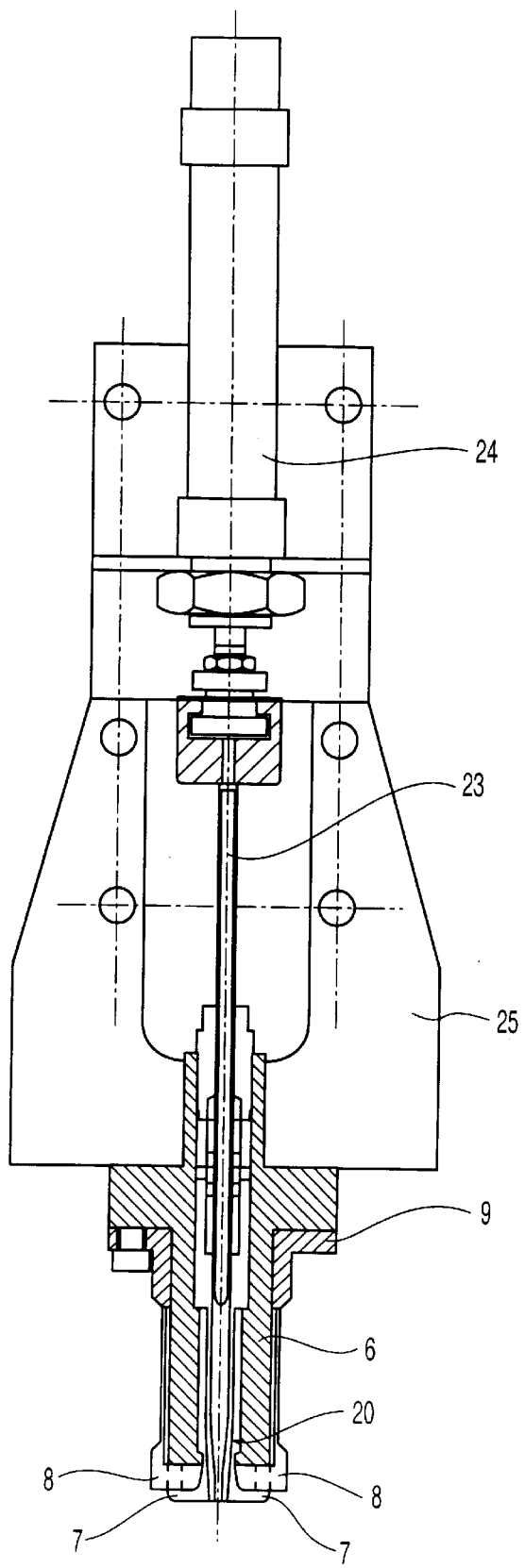
FIG. 2 is a view of a preferred embodiment of the device according to the invention.
Figure 3:
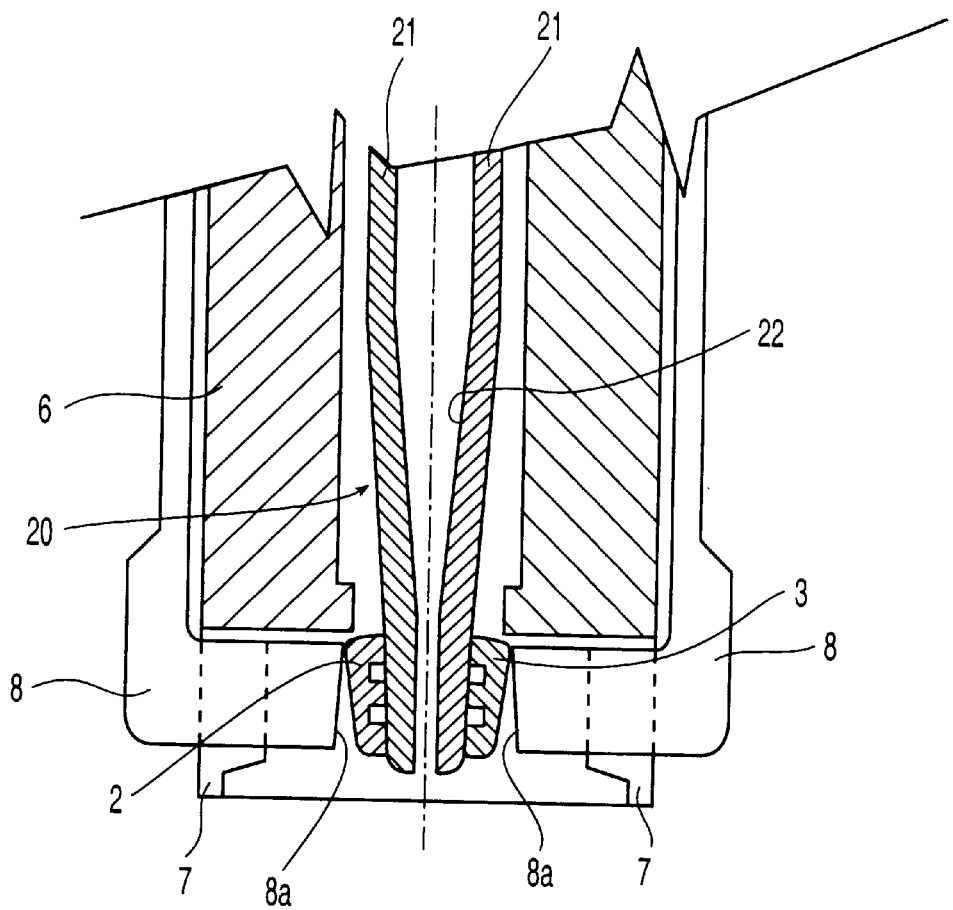
FIG. 3 is a view at an enlarged scale of the lower end of the device of FIG. 2, in a different condition of operation.
Figure 4:
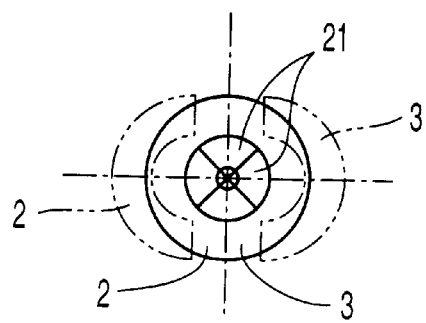
FIG. 4 is an end view of the detail of FIG. 3.

With reference to FIGS. 2–4, the main difference of the device according to the invention with respect to that previously proposed, and shown in FIG. 1, lies in that in the new device the pushing rod 9 is not inserted directly between the two cone half-bits 2, 3 since it is slidably mounted within a sleeve 20 defined by a plurality of longitudinal petals 21 which are elastically deflectable outwardly. These petals are adapted to be introduced inside the two cone half-bits 2, 3, in a way similar to what has been described for the pushing rod 9 with reference to the previously proposed solution shown in FIG. 1, these petals being also adapted to open due to the engagement of the tip of the pushing rod 9 into an end conical portion 22 of the inner passage defined between the petals 21.

FIG. 2 shows the device separated from the valve, before the assembling operation is carried out, whereas FIG. 3 shows the device with the petals 21 already introduced within the two cone half-bits 2, 3 (in FIG. 3, the upper end of stem 4 of valve 5 and the cooperating cup element 13 have not been shown, for convenience of illustration). During the stage corresponding to the condition shown in FIG. 3, the cup element 13 is kept pressed downwardly, against the action of spring 11, by the pushing fingers 7 of the tubular body 6, as already described with reference to the solution of FIG. 1. As a matter of fact, the operation of the inserting device according to the invention is absolutely similar to that described already with reference to the previously proposed solution, shown in FIG. 1, apart from that the diverging movement of the two cone half-bits 2, 3 is obtained by the engagement between them not of the pushing rod 9 directly, as in the case of FIG. 1, but rather of the outwardly deflectable petals 21, which are opened due to the vertical downward movement of the pushing rod 9 and engagement thereof within the end conical portion 22 of the inner passage defined between petals 21. In this manner, the diverging movement of the two cone half-bits is obtained without any relative sliding movements on the cone half-bits. The petals 21 are indeed in a fixed axial position when they are diverged and thus they provide a better control of the position of the cone half-bits during the assembling stage.

According to a further preferred feature (FIG. 2) the pushing rod 9 is directly connected to the stem 23 of a fluid cylinder 24 carried by the supporting structure 25 to which also the tubular body 6 is secured and which is vertically moved in order to carry out the assembling operation of the cone half-bits by displacing means of any known type (not shown).

Naturally, while the principle of the invention remains the same, the embodiments and the details of construction may widely vary with respect to what has been described and illustrated purely by way of example, without departing from the scope of the present invention.

I claim:

1. Device for automated assembling of cone half-bits on a valve of an internal combustion engine, said valve being of the type comprising a mushroom-shaped body including a stem on whose free end a cup element is to be secured having a conical inner surface tapering towards the mushroom-shaped head of the valve and an outer annular flange for abutment of one or more helical return springs for the valve, said cup element being secured on said end of the stem of the valve with the interposition of an annular body having an outer conical surface also tapering towards the mushroom-shaped head of the valve, defined by two cone half-bits which are freely in contact with each other at a plane containing the axis of said annular body, said cone half-bits defining, in their assembled condition, one or more circumferential inner ribs which engage cooperating circumferential grooves provided on said end of the stem of the valve, said device comprising means for mounting said cone half-bits by causing them to slide on the stem of the valve while holding them in a diverging condition, with their ends of lower diameter spaced apart from each other, said means including a tubular body adapted to be moved along an axis coincident with the axis of the stem of the valve and adapted to engage the annular flange of the cup element, said tubular body being provided with a plurality of jaws which are elastically deflectable outwardly in a radial direction, said jaws having inner inclined surfaces diverging from each other towards the mushroom-shaped head of the valve and adapted to engage the end surfaces of greater diameter of the two cone half-bits, said device further including a pushing rod slidably mounted within the tubular body and ending with a tip which is for cooperating with a sleeve for holding the two cone half-bits in the said diverging position until they reach their assembling position on the stem, wherein said pushing rod is slidably mounted within said sleeve defined by a plurality of longitudinal petals which are elastically deflectable outwardly in a radial direction due to the engagement of said pushing rod within an end conical portion of an inner passage defined between said petals to engage and hold said two cone half-bits in a diverging condition.

2. Device according to claim 1, wherein said pushing rod is subjected to the action of return spring.

3. Device according to claim 1, wherein said pushing rod is connected to the stem of a fluid cylinder.

* * * * *